United States Patent
Fujino

(10) Patent No.: US 8,244,230 B2
(45) Date of Patent: Aug. 14, 2012

(54) TERMINAL FUNCTION COMPLETION METHOD AND SYSTEM, AND COMMUNICATION TERMINAL, PERIPHERAL TERMINAL AND COMMUNICATION TERMINAL MANAGEMENT SERVER CONSTITUTING THE SYSTEM

(75) Inventor: Shouzou Fujino, Tokyo (JP)

(73) Assignee: NEC Corporation, Tokyo (JP)

(*) Notice: Subject to any disclaimer, the term of this patent is extended or adjusted under 35 U.S.C. 154(b) by 998 days.

(21) Appl. No.: 12/092,112

(22) PCT Filed: Nov. 1, 2006

(86) PCT No.: PCT/JP2006/321853
§ 371 (c)(1),
(2), (4) Date: Apr. 30, 2008

(87) PCT Pub. No.: WO2007/052696
PCT Pub. Date: May 10, 2007

(65) Prior Publication Data
US 2009/0239519 A1    Sep. 24, 2009

(30) Foreign Application Priority Data
Nov. 2, 2005    (JP) .................................. 2005-319584

(51) Int. Cl.
*H04M 3/00*    (2006.01)
(52) U.S. Cl. .... 455/418; 455/420; 455/41.2; 455/435.1; 455/550.1

(58) Field of Classification Search .................. 455/418, 455/420, 41.2, 435.1, 550.1
See application file for complete search history.

(56) References Cited

U.S. PATENT DOCUMENTS

| | | | |
|---|---|---|---|
| 5,790,536 A * | 8/1998 | Mahany et al. ............... | 370/338 |
| 2001/0021246 A1 | 9/2001 | Okajima et al. | |
| 2005/0027807 A1* | 2/2005 | Fengler et al. ............... | 709/206 |
| 2005/0193101 A1* | 9/2005 | Oliver et al. ................... | 709/220 |
| 2005/0195779 A1 | 9/2005 | Matsumoto | |

FOREIGN PATENT DOCUMENTS

| | | |
|---|---|---|
| CN | 1309504 A | 8/2001 |
| CN | 1665255 A | 9/2005 |
| JP | 2001-189771 A | 7/2001 |
| JP | 2004-187053 A | 7/2004 |
| JP | 2004-304623 A | 10/2004 |
| JP | 2005-252501 A | 9/2005 |
| WO | 03/034762 A1 | 4/2003 |

OTHER PUBLICATIONS

Office Action, Issued Mar. 21, 2012 by the Japanese Patent Office in counterpart Japanese Application No. 2007-542780.

* cited by examiner

*Primary Examiner* — Nghi H Ly
(74) *Attorney, Agent, or Firm* — Sughrue Mion, PLLC

(57) ABSTRACT

It is an object of the present invention to realize a system which enables use a new application with a terminal which has been used heretofore, and the system comprises a function which is installed on a network and manages application information compatible with the communication terminal, and a function which is installed on the communication terminal and which is connected with a peripheral terminal through a short distance connection to transfer data.

4 Claims, 2 Drawing Sheets

TERMINAL FUNCTION COMPLETION METHOD AND SYSTEM, AND COMMUNICATION TERMINAL, PERIPHERAL TERMINAL AND COMMUNICATION TERMINAL MANAGEMENT SERVER CONSTITUTING THE SYSTEM

TECHNICAL FIELD

The present invention relates to a method of function completion for a terminal in mobile communication services, particularly to a method and system of terminal function completion in which compatible application information for a terminal is managed at a network side and data is transferred at a terminal side by connecting with a peripheral terminal; and a communication terminal, a peripheral terminal, and a communication terminal management server making up the system.

BACKGROUND ART

Presently, mobile communication services based on mobile telephones, which are widespread throughout the world, include UMTS (Universal Mobile Telecommunication Service), PDC (Personal Digital Cellular), GSM (Global System for Mobile Communications) and the like. The current situation for GSM, which is the newest among the foregoing, is such that new mobile telephone terminals are released every several months, each time of which new input devices, connection interfaces, and applications are installed thereon.

Specific examples of such new functions include a high resolution digital camera as an input device; an infrared communication, a USB, an external memory as a connection interface; and a television telephone, streaming, and an IP messenger as an application.

Thus, there is a situation in which gaps exist between the functions installed on communication terminals owned by users depending of the time when they were purchased.

In such situation, when, for example, an attempt is establish a TV telephone connection from a mobile hone that has a TV telephone function to a mobile telephone that does not have a TV telephone function, a determination is made whether the connection counterpart support a Television function, by referring to the subscriber information that is obtained by searching the subscriber identifier "IMSI" of the connection counterpart by means of an HLR (Home Location Register), which is a subscriber database on a carrier network. As a result, since the function is not supported, the HLR will notify the connection origin that the connection counterpart is not compatible with the TV telephone function.

Current mobile telephones can utilize an infrared communication, an USB, and so on for connection with other peripheral terminals. On the other hand, technologies for implementing short distance wireless connection on a personal computer and the like include WLAN, Bluetooth, Zig Bee, and others.

Currently, standardization organizations are studying a network which starts with the utilization of IP technology for mobile network infrastructures and which will accommodate stationary networks as well, as an ALL-IP Network. Further, an architecture called a PAN (Personal Area Network) is proposed in which a network is formed of a mobile telephone having a subscriber identifier to identify mobile subscriber on a mobile network, and a plurality of terminals linked by a short distance connection.

Patent document 1 (Japanese Patent Application Laid-Open No. 2004-187053) discloses a technique to make services available by acquiring appropriate resources from a network when there is a discrepancy in function such as a coding scheme between terminals of video/voice communication service users.

Patent Document 1: Japanese Patent Application Laid-Open No. 2001-187053.

Between communication terminals such as mobile telephones owned by users, there is a gap occurs in the applications installed on mobile phones that depends on the time when the phones were purchased. In order to use new functions, the user has no choice but to purchase a new communication terminal that is compatible with these functions which leads to the problem that the user needs to make frequent purchases, which places a heavy financial burden on him/her.

The technique disclosed by Patent document 1 has a problem in that although it can to complement an existing function, it is not intended to add a new function and thus is unable to keep up with new applications.

DISCLOSURE OF THE INVENTION

The present invention has been made in view of the above described problem of related arts, and its object is to realize a system that enables an existing terminal to use a new application.

The terminal function completion method of the present invention is a method of terminal function completion including: a communication terminal which is installed with a routing table; a communication terminal management server which is connected to the above described communication terminal via a first network and which stores a function installed on the above described communication terminal as communication terminal compatible function information; and a peripheral terminal which is connected with the above described communication terminal via a second network, the above described method characterized by arranging:

that the above described communication terminal installed on the above described peripheral terminal, in addition to a function of the above described communication terminal itself, registers a function to the above described communication terminal management server as communication terminal compatible function information, and stores a function, which is installed on the above described peripheral terminal and which is not installed on the above described communication terminal itself, in the above described routing table in such a way that the function is associated with the peripheral terminal;

that when a connection to the above described communication terminal via the above described first network is initiated by a counterpart terminal, the above described communication terminal management server confirms if the above described communication terminal is installed with a specific function which is utilized by the above described counterpart communication terminal, by referring to the above described communication terminal compatible function information, and when the above described communication terminal is installed with the above described specific function, the above described counterpart terminal is notified that the above described communication terminal is installed with the above described specific function; and that when the above described specific function is a function which is not installed on the above described communication terminal itself, the above described communication terminal refers to the above described routing table and performs communication with the above described counterpart terminal by using the above described peripheral terminal which is stored in association with the above described specific function.

The terminal function completion system of the present invention is a terminal function completion system including: a communication terminal which is installed with a routing table; a communication terminal management server which is connected to the communication terminal via a first network and which stores a function installed on the above described communication terminal as communication terminal compatible function information; and a peripheral terminal which is connected to the above described communication terminal via a second network, the above described terminal function competing system being characterized in that:

the above described communication terminal management server comprises a control part which, when a connection to the above described communication terminal via the above described first network is initiated by a counterpart terminal, confirms if the above described communication terminal is installed with a specific function which is utilized by the above described counterpart communication terminal by referring to the above described communication terminal compatible function information, and when the above described communication terminal is installed with the above described specific function, notifies the above described counterpart communication terminal that the above described communication terminal is installed with the above described specific function; and the above described communication terminal comprises a control part which registers a function installed on the above described peripheral terminal, in addition to a function of the above described communication terminal itself, to the above described communication terminal management server as communication terminal compatible function information, and stores a function, which is installed on the above described peripheral terminal and which is not installed on the above described communication terminal itself, in the above described routing table in such a way that the function is associated with the peripheral terminal; and when the above described specific function is a function which is not installed on the above described communication terminal itself, refers to the above described routing table and performs communication with the above described counterpart terminal using the above described peripheral terminal which is stored in association with the above described specific function.

The peripheral terminal of the present invention is a peripheral terminal: which makes up a terminal function completion system in conjunction with a communication terminal which is installed with a routing table and a communication terminal management server which is connected to the above described communication terminal via a first network and which stores a function installed on the above described communication terminal as communication terminal compatible function information; and which is connected with the above described communication terminal via a second network, the above described peripheral terminal characterized by comprising:

a control part which constructs a secure link between the above described control part itself and the above described communication terminal upon activation, and notifies the above described communication terminal of an originally installed function of the above described control part itself.

The communication terminal management server of the present invention is a communication terminal management server: which comprise a terminal function completion system in conjunction with a communication terminal which is installed with a routing table, and a peripheral terminal which is connected to the above described communication terminal via a second network; and which is connected to the above described communication terminal via a first network, and stores a function installed on the above described communication terminal as communication terminal compatible function information, the above described communication terminal management server characterized by comprising:

a control part which, when a connection to the above described communication terminal via the above described first network is initiated by a counterpart terminal, confirms if the above described communication terminal is installed with a specific function which is utilized by the above described counterpart communication terminal by referring to the above described communication terminal compatible function information, and when the above described communication terminal is installed with the above described specific function, notifies the above described counterpart terminal that the above described communication terminal is installed with the above described specific function.

The communication terminal of the present invention is a communication terminal including a routing table, characterized in that the above described communication terminal comprises a terminal function completing system in conjunction with a communication terminal management server which is connected to the above described communication terminal via a first network and stores a function installed on the above described communication terminal as communication terminal compatible function information, and a peripheral terminal which is connected with the above described communication terminal via a second network, and the above described communication terminal comprises a control part: which registers a function installed on the above described peripheral terminal, in addition to a function of the above described communication terminal itself, to the above described communication terminal management server as communication terminal compatible information, and stores a function, which is installed on the above described peripheral terminal and which is not installed on the above described communication terminal itself, in the above described routing table in such a way that the function is associated with the peripheral terminal; and which, when a specific function, which is utilized by a counterpart terminal connected via the above described first network is a function which is not installed on the above described communication terminal itself, refers to the above described routing table and performs communication with the above described counterpart terminal by using the above described peripheral terminal which is stored in association with the above described specific function.

In this case, configuration may be such that the routing table stores a peripheral terminal, a function, and a secure link in such a way that they are associated with each other, and when communication by use of the above described specific function is initiated by a connection counterpart and when the above described communication terminal receives data, the above described control part determines from header information of a packet that a specific function is used, and determines a peripheral terminal that supports the specific function and a secure link to be used for the connection to the peripheral terminal by referring to the above described routing table, thereby transferring data to the peripheral terminal by using is the above described secure link.

In the above described configuration of the present invention, applications that are installed on a communication terminal are registered, including applications installed on a peripheral terminal, to a communication terminal management server. Thereafter, communication by an application installed on the peripheral terminal is performed using a peripheral terminal stored in association with the application in a routing table. Therefore, even a user of a communication terminal which is not installed with a new application, can utilize the new application.

The present invention enables the following.

A user can utilize a new application of a communication terminal at a low cost.

Since a carrier does not manage peripheral terminals, it is not necessary to change the existing subscriber management method.

The carrier can provide a new function to a user without making major modifications to the infrastructure of the mobile network.

DESCRIPTION OF SYMBOLS

Figure 1:
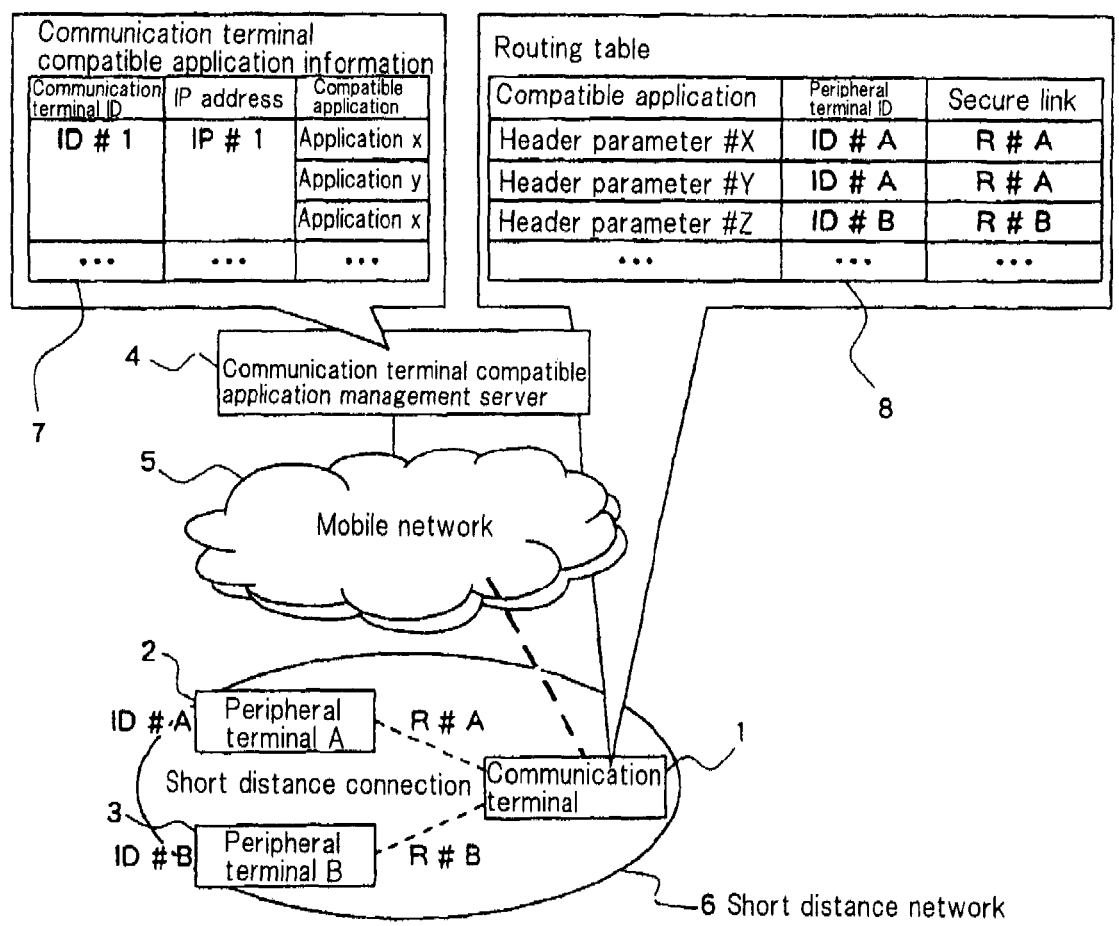
FIG. 1 shows the system configuration of a best mode of the present invention.

1 Communication terminal
2, 3 Peripheral terminal
4 Communication terminal compatible application management server
5 Mobile network
6 Short distance network
7 Communication terminal compatible application information
8, 16 Routing table
9 Mobile telephone
10 PDA
11 Note PC
12 HLR
13 PLMN
14 PAN
15 Mobile telephone compatible application information

BEST MODE FOR CARRYING OUT THE INVENTION

Next, exemplary embodiments of the present invention will be described with reference to the drawings.

FIG. 1 shows the configuration of an exemplary embodiment is of the system according to the present invention.

The present exemplary embodiment is made up of communication terminal 1, peripheral terminal A2 (ID#A), peripheral terminal B3 (ID#B), communication terminal compatible application management server 4, and mobile network 5.

Communication terminal 1 is a terminal in mobile network 5 to which mobile users subscribe, and has several short distance connection interfaces besides a communication interface with mobile network 5. Peripheral terminal A2 and peripheral terminal B3 are terminals, which are physically located a short distance from communication terminal 1, and which can communicate with communication terminal 1 by a short distance connection, where the network made up of communication terminal 1, peripheral terminal A2, and peripheral terminal B3, which can communicate through a short distance connection, is called short distance network 6.

Communication terminal 1 retains routing table 8 for transferring data to peripheral terminal A2 and peripheral terminal B3. Mobile network 5 is provided with communication terminal compatible application management server 4, and the foregoing communication terminal compatible application management server 4 retains communication terminal compatible application information 7.

Each of communication terminal 1, peripheral terminal A2, peripheral terminal B3 and communication terminal compatible application management server 4 utilizes a general computer system, and communication terminal compatible application information 7 and routing table 8 are implemented in a memory system making up the computer system. The operation of each part in the description below is performed by each control part according to a program accumulated in the memory system, a description of which is omitted since these are common techniques.

Next, the operation of the present system will be described.

When peripheral terminal A2 is newly activated, a secure link of identifier R#A is constructed between itself and communication terminal 1, and peripheral terminal A2 notifies communication terminal 1 that an originally installed function of peripheral terminal A2 is application 'x'.

Communication terminal 1 detects that application 'x' of the received information is a function which is not installed on itself, and registers the application to communication terminal compatible application management server 4 located on mobile network 5. Communication terminal compatible application management server 4 stores communication terminal compatible application information on mobile network 5 as communication terminal compatible application information 7, and registers the above described application 'x' in addition to the function installed on communication terminal 1 itself as the function installed on communication terminal 1. Upon the registration, application 'x' as well as ID (ID#1) and the IP address (IP#1) of communication terminal 1 are registered.

On the other hand, communication terminal 1 quantitatively converts the information of application 'x' as a parameter of a packet header (header parameter #X), to record it together with the ID (ID#A) of peripheral terminal A2 and secure link identifier (R#A) in routing table 8.

When, in the above described situation, a connection from a connection counterpart (not shown) to communication terminal 1, via mobile network 5 is initiative by using application 'x', communication terminal compatible application management server 4 on mobile network 5 performs the search on communication terminal compatible application information 7 by using communication terminal ID (ID#1) of communication terminal 1 and refers to the stored content to examine whether or not communication terminal 1 supports application 'x'.

As a result of the examination, it is detected that the application is supported, and therefore communication terminal compatible application management server 4 notifies the connection counterpart that application 'x' is supported.

Thereafter, when communication from the connection counterpart 'x' is initiated, by using application communication terminal 1 receives data for the time being. Then, referring to own routing table 8, communication terminal 1 determines that application 'x' is used, based on the parameter (header parameter #X) contained in the header of the packet of the received data from the connection counterpart, and further determines that the peripheral terminal ID supporting application 'x' is ID#A and that the secure link used for the connection is R#A. The received data is transferred to peripheral terminal A2 by using secure link R#A, and the user is allowed to utilize application 'x' at peripheral terminal A2.

The presence of peripheral terminal A2 is invisible from mobile network 5, and it looks as if communication terminal 1 is using application 'x'.

When a peripheral terminal is uncoupled from short distance network 6 and the secure link is disengaged, communication terminal 1 searches for the compatible application (header parameter) stored in conjunction with the disengaged secure link in order to delete them. At this moment, confirmation is made whether or not the same compatible application is registered. When the same compatible application is not registered in routing table 8, the compatible application is deleted from communication terminal compatible application information 7 of communication terminal compatible application management server 4.

Moreover, although description has been made such that a peripheral terminal notifies communication terminal 1 of the originally installed functions of the peripheral terminal, configuration may be such that all the installed functions of the peripheral terminal are notified to communication terminal 1, and communication terminal 1 compares them with its own installed function to register the gap therebetween to communication terminal compatible application information 7 of communication terminal compatible application management server 4.

Further, although description is such that registration of the originally installed functions of a peripheral terminal to communication terminal compatible application information 7, as a new compatible application of communication terminal 1, is performed by communication terminal 1, the peripheral terminal may perform this. In this case, a secure link is constructed between the peripheral terminal and communication terminal 1, and the peripheral terminal performs the comparison between the installed function of communication terminal 1 and installed function of its own, and will register the gap therebetween to communication terminal compatible application information 7 of communication terminal compatible application management server 4 via communication terminal 1.

Further, compatible application information 7 retained by communication terminal compatible application management server may be application information of SIP (Session Initiation Protocol), and SDP (Session Description Protocol) as well as application identifiers.

Figure 2:
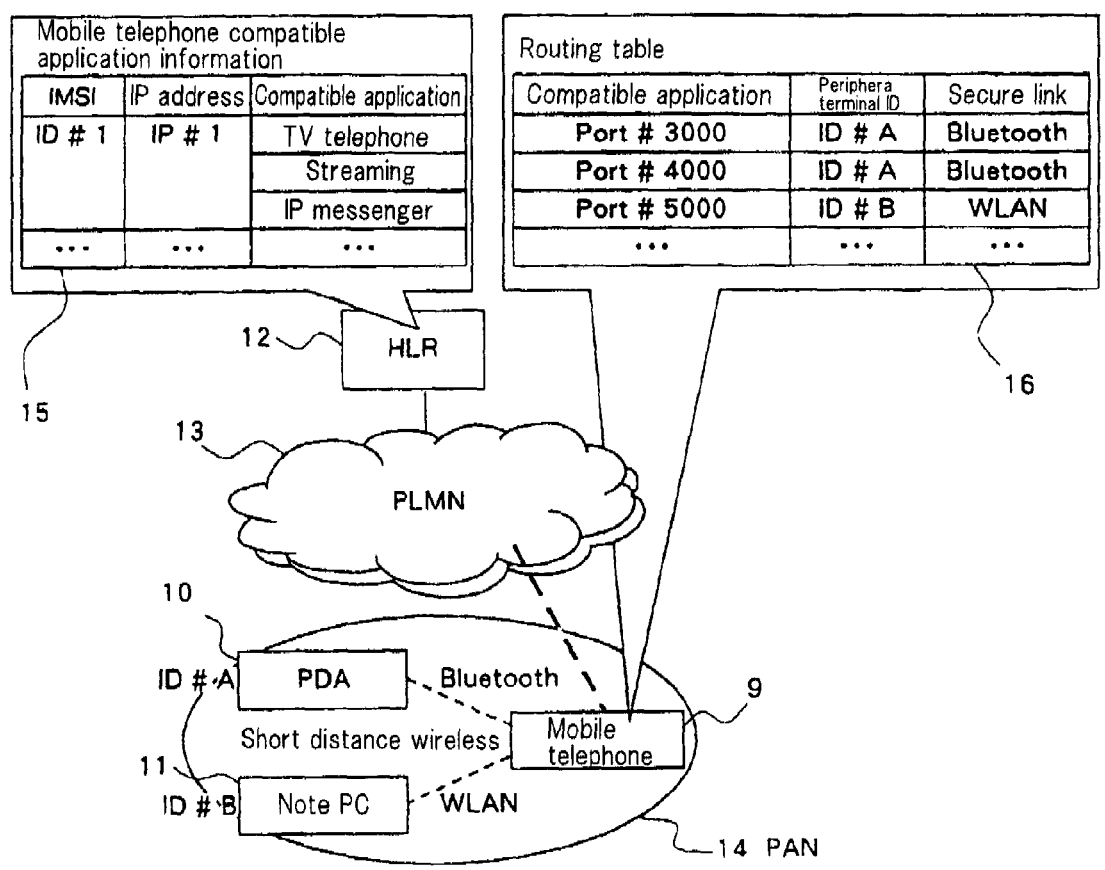
FIG. 2 shows the system configuration of an exemplary embodiment of the present invention.

FIG. 2 is a block diagram to show the configuration of a specific exemplary embodiment according to the present invention.

In the present exemplary embodiment, mobile telephone 9 is used as communication terminal 1 in FIG. 1; and PDA (Personal Digital Assistance) 10 and note PC 11 are used as peripheral terminal A2 and peripheral terminal B3. These are located at a short physical distance from each other and form PAN (Personal Area Network) 14 (short distance network), which are linked by any connection upon activation, and which is accommodated by PLMN (Public Land Mobile Network) 13 (mobile network), which is a UMTS (Universal Mobile Telecommunications System) network.

When PDA 10 is newly activated, it constructs a secure Bluetooth (registered trademark) link between itself and mobile telephone 9, and notifies mobile telephone 9 that an originally installed function of PDA 10 is a TV telephone function. Mobile telephone 9 detects that the TV telephone function of the received information is a function which is not included in itself, and registers it to HLR (Home Location Register) 12 on PLMN 13.

On the other hand, mobile telephone 9 quantitatively converts the information of TV telephone function into a Port Number value (Port #3000) which is the transport layer during communication, and records it in conjunction with a peripheral terminal ID (ID#A) and secure link information (Bluetooth) to routing table 16.

When a connection for using the TV telephone function from a connection counterpart to mobile telephone 9 is initiated, a referral is made to mobile telephone compatible application information 15, which will search the IMSI (International Mobile Subscriber Identity) of mobile telephone 9 to examine, by means of HLR 12 on PLMN 13, whether mobile telephone 9 supports the TV telephone function. As a result, since it is detected that the application is supported, HLR 12 notifies the connection counterpart that the TV telephone function is supported.

When communication from a connection counterpart by use of TV telephone function is initiated, mobile telephone 9 receives data for the time being. Then, mobile telephone 9 refers to its own routing table 16 and determines that the TV telephone function is used from Port Number (Port #3000) included in the header of a packet, and further determines that the peripheral terminal ID which supports the TV telephone function is ID #A, and that the secure link used for connection is Bluetooth. The data is transferred by using the secure link to PDA 10, and the user is allowed to use the TV telephone function with PDA 10. The presence of PDA 10 is not visible from PLMN 13, and it looks as if mobile telephone 9 is utilizing the TV telephone function.

INDUSTRIAL APPLICABILITY

Further, the present exemplary embodiment will have the same architecture even when a future AII-IP network accommodates PAN 14 and, in that case, HLR 12 will be extended to have an HSS (Home Subscriber Server) function as well.

The invention claimed is:

1. A method of terminal function completion including: a communication terminal which is installed with a routing table; a communication terminal management server which is connected with said communication terminal via a first network and which stores a function installed on said communication terminal as communication terminal compatible function information; and a peripheral terminal which is connected with said communication terminal via a second network, said method characterized by arranging:

that said communication terminal registers a function installed on said peripheral terminal, in addition to a function of said communication terminal itself, to said communication terminal management server as communication terminal compatible function information, and stores a function, which is installed on said peripheral terminal and which is not installed on said communication terminal itself, in said routing table in such a way that the function is associated with the peripheral terminal;

that when a connection to said communication terminal via said first network is initiated by a counterpart terminal, said communication terminal management server confirms whether said communication terminal is installed with a specific function which is utilized by said counterpart communication terminal, by referring to said communication terminal compatible function information, and when said communication terminal is installed with said specific function, said counterpart terminal is notified that said communication terminal is installed with said specific function; and that when said specific function is a function which is not installed on said communication terminal itself, said communication terminal refers to said routing table and performs communication with said counterpart terminal by using said peripheral terminal which is stored in association with said specific function.

2. A terminal function completion system including: a communication terminal which is installed with a routing table; a communication terminal management server which is connected with the communication terminal via a first network and which stores a function installed on said communication terminal as communication terminal compatible function information; and a peripheral terminal which is connected with said communication terminal via a second network, said terminal function competing system being characterized in that:

said communication terminal management server comprises a control part which, when a connection to said communication terminal via said first network is initiated by a counterpart terminal, confirms whether said communication terminal is installed with a specific function which is utilized by said counterpart communication terminal by referring to said communication terminal compatible function information, and when said communication terminal is installed with said specific function, notifies said counterpart communication terminal that said communication terminal is installed with said specific function; and said communication terminal comprises a control part which registers a function installed on said peripheral terminal, in addition to a function of said communication terminal itself, to said communication terminal management server as communication terminal compatible function information, and stores a function, which is installed on said peripheral terminal and which is not installed on said communication terminal itself, in said routing table in such a way that the function is associated with the peripheral terminal; and when said specific function is a function which is not installed on said communication terminal itself, refers to said routing table and performs communication with said counterpart terminal by using said peripheral terminal which is stored in association with said specific function.

3. A communication terminal including a routing table, characterized in that said communication terminal comprises a terminal function completing system in conjunction with a communication terminal management server which is connected with said communication terminal via a first network and which stores a function installed on said communication terminal as communication terminal compatible function information, and a peripheral terminal which is connected with said communication terminal via a second network, and said communication terminal comprises a control part: which registers a function installed on said peripheral terminal, in addition to a function of said communication terminal itself, to said communication terminal management server as communication terminal compatible information, and stores a function, which is installed on said peripheral terminal, and which is not installed on said communication terminal itself, in said routing table in such a way that the function is associated with the peripheral terminal; and said control part, when a specific function which is used by a counterpart terminal connected via said first network is a function which is not installed on said communication terminal itself, refers to said routing table and performs communication with said counterpart terminal by using said peripheral terminal which is stored in association with said specific function.

4. The communication terminal according to claim 3, characterized in that:

said routing table stores a peripheral terminal, a function, and a secure link in such a way that they are associated with each other, and when a communication by use of said specific function is initiated by a connection counterpart and said communication terminal receives data, said control part determines from header information of a packet that a specific function is used, and determines a peripheral terminal supporting the specific function and a secure link to be used for the connection with the peripheral terminal by referring to said routing table, thereby transferring data to the peripheral terminal by using said secure link.

* * * * *